April 15, 1941.  H. W. SNYDER  2,238,295
EXERCISER
Filed July 25, 1940
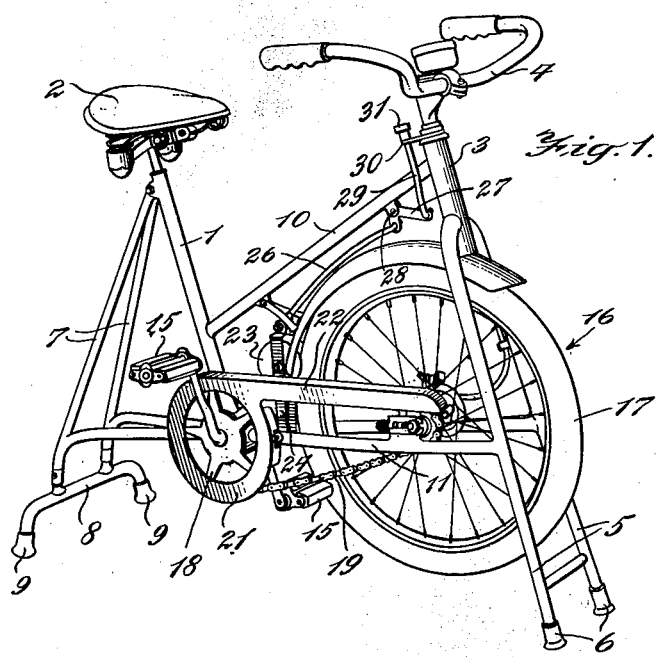
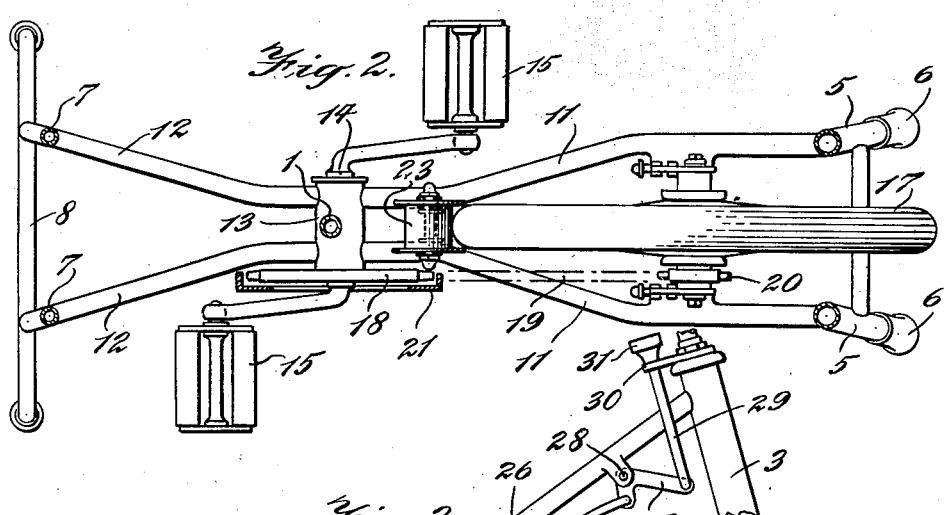
INVENTOR.
Harry W. Snyder,
BY Gifford, Scull & Burgess
ATTORNEYS.

Patented Apr. 15, 1941

2,238,295

UNITED STATES PATENT OFFICE 2,238,295

EXERCISER

Harry W. Snyder, Little Falls, N. Y., assignor to H. P. Snyder Mfg. Company, Inc., Little Falls, N. Y., a corporation of New York Application July 25, 1940, Serial No. 347,395

2 Claims. (Cl. 272—73)

This invention relates to a novel and improved exerciser, more particularly of the bicycle type, and the novel features will be better understood from the following description and the annexed drawing, in which I have shown a selected embodiment of the invention and in which:

Fig. 1 is a perspective view of the selected embodiment of the invention;

Fig. 2 is a horizontal sectional view through the exerciser shown in Fig. 1;

Fig. 3 is a fragmentary elevation showing part of the device shown in Fig. 1.

According to the invention, a frame is provided having a rear post 1 supporting a seat 2, and a front post 3 supporting a handle bar 4 having the usual handles. The post 3 is supported by a fork having two arms 5, on the lower ends of which are feet 6, and extending downwardly from near the top of the post 1 is another fork having two arms 7 which are connected at their lower ends to a pedestal 8 having two feet 9. The feet 6 and 9 have their bottoms disposed preferably in a common horizontal plane so that they may rest upon the floor, as will be understood by those skilled in the art.

Connecting the two posts 1 and 3 is a top bar 10 which is secured to the post 3 near the top thereof and to the post 1 at a point remote from the top so that the exerciser may be used either by men or women or by invalids or cripples who normally have difficulty in raising their legs over the top bar of the exerciser. At the same time the top bar is present to add rigidity to the frame.

Connecting the arms 5 and 7 is a cross brace consisting of two arms 11 connected to the arms 5 of the front fork and two arms 12 connected to the arms 7 of the rear fork. The cross of the brace is formed by a bearing 13 within which is rotatably supported the hub 14 for a pair of pedals 15.

By the above construction it will be seen that there is provided a frame which may be set upon the floor and which is rigidly braced so that any tendency for the forks to spread is resisted so that the exerciser generally will be stable when in use. Moreover, as indicated, the various parts are formed of tubing which may be integrally united, as by welding, to form what is in effect a one-piece frame which will not become loose and out of shape during use. The cross bracing near the lower ends of the two forks serves to hold those forks against spreading and also to prevent any tendency for a cross axial stress on the axle of the wheel which might be caused by spreading of the front fork.

Rotatably mounted on the frame and preferably extending between the arms 5 of the front fork is a wheel designated generally as 16, which may consist of the usual hub, spokes, and rim of a bicycle wheel and also may comprise a tire 17 which is semi-pneumatic instead of being of the solid type previously used. The tire is made heavy enough so that it will give a proper flywheel action to the wheel as it rotates.

Preferably the wheel is rotatably mounted on the two cross arms 11, as plainly shown in Figs. 1 and 2. The details of the bearings by which the wheel is mounted will not be described, as they are not necessary to an understanding of the invention. It is sufficient to say that the wheel is thus rotatably mounted on the frame and that it may be driven from the pedals 15 through any suitable driving connection, here indicated as a sprocket wheel 18 meshing with a sprocket chain 19, which in turn meshes with a smaller sprocket wheel 20 connected to the wheel. A chain guard 21 preferably surrounds the sprocket wheel 18 and extends along and over the upper reach of the chain, as indicated at 22, terminating above and extending over the smaller sprocket wheel 20.

In order to increase or decrease the amount of work necessary to rotate the wheel 16 and thus vary the amount of exercise which may be had by operating the exerciser, there is provided a tension roller 23 which is shown as rotatably mounted on a support 24 pivoted at 25 on the cross brace and more specifically on the arms 11 thereof. The support may be rotated on its pivot 25 so as to bring the roller towards or away from the wheel by means of a link 26 which is pivoted to the support 24 and is also pivoted to a bell crank lever 27 pivoted at 28 on the top bar 10. The lever 27 may be operated by means of a handle 29 passing through a plate 30 secured to the front post 3 and in turn may be moved by means of an adjustment screw 31 threaded to the handle and contacting with the plate 30.

While I have shown the invention as embodied in a specific form, it is to be understood that various changes in details may be made without departing from the scope of the invention as defined by the appended claims.

I claim:

1. An exerciser comprising a rear fork having a pair of legs lying in an inclined plane and a front fork having a pair of legs lying in another inclined plane, said planes being inclined toward each other, the legs of said forks diverging downwardly; a transverse brace comprising a pair of bifurcated members having legs lying in a plane intersecting the planes of the rear and front forks, the said pair of bifurcated members being joined at their convergent ends to a bearing member carrying a crank shaft for driving the exerciser, the said bifurcated members being joined at their divergent ends to the divergent legs of the rear fork and front fork, respectively; a front post extending from the convergent end of the front fork, a rear post joined at one end to the convergent end of the rear fork and at the other end to the bearing member on the transverse brace and forming a pyramidal support for a seat carried by said rear post, a top bar connecting the rear and front posts, the axis of the said bar defining, with the axis of the rear post, the plane of the front fork and the plane of the transverse brace a substantially trapezoidal area; a driven wheel rotatably mounted on said transverse brace between a pair of the bifurcated members of said brace and occupying a portion of said trapezoidal area; a support pivotally mounted on said transverse brace; means on said support to frictionally engage said driven wheel and means carried by said top bar to move said first named means towards or away from said wheel.

2. An exerciser comprising a rear fork having a pair of legs lying in an inclined plane and a front fork having a pair of legs lying in another inclined plane, said planes being inclined toward each other, the legs of said forks diverging downwardly; a transverse brace comprising a pair of bifurcated members having legs lying in a plane intersecting the planes of the rear and front forks, the said pair of bifurcated members being joined at their convergent ends to a bearing member carrying a crank shaft for driving the exerciser, the said bifurcated members being joined at their divergent ends to the divergent legs of the rear fork and front fork, respectively; a front post extending from the convergent end of the front fork, a rear post joined at one end to the convergent end of the rear fork and at the other end to the bearing member on the transverse brace and forming a pyramidal support for a seat carried by said rear post, a top bar connecting the rear and front posts, the axis of the said bar defining, with the axis of the rear post, the plane of the front fork and the plane of the transverse brace a substantially trapezoidal area; a driven wheel rotatably mounted on said transverse brace between a pair of the bifurcated members of said brace and occupying a portion of said trapezoidal area; braking means mounted on said transverse brace and adapted to apply, when placed in operative position, a controlled braking force to said wheel, and means carried by said top bar to place said braking means in operative position.

HARRY W. SNYDER.